(12) United States Patent
Adam et al.

(10) Patent No.: US 7,513,934 B2
(45) Date of Patent: Apr. 7, 2009

(54) MICRO PROCESSING SYSTEM FOR MULTI-PHASE FLOW

(75) Inventors: Darcee C. Adam, Anchorage, AK (US); Daniel L. Wuthrich, Anchorage, AK (US)

(73) Assignee: Brooks Range Petroleum Corporation, Wichita, KS (US)

( * ) Notice: Subject to any disclaimer, the term of this patent is extended or adjusted under 35 U.S.C. 154(b) by 505 days.

(21) Appl. No.: 11/144,085

(22) Filed: Jun. 6, 2005

(65) Prior Publication Data

US 2006/0272503 A1 Dec. 7, 2006

(51) Int. Cl.
*B01D 19/00* (2006.01)
(52) U.S. Cl. .............................. 95/253; 95/256; 95/258; 95/259; 96/184; 96/185; 210/241
(58) Field of Classification Search ................... 95/253, 95/254, 256, 258, 259, 255, 257; 96/183, 96/184, 185, 186, 182; 210/241
See application file for complete search history.

(56) References Cited

U.S. PATENT DOCUMENTS

| | | | | | |
|---|---|---|---|---|---|
| 4,948,393 | A | * | 8/1990 | Hodson et al. | 95/250 |
| 5,069,779 | A | * | 12/1991 | Brown et al. | 210/87 |
| 5,109,934 | A | * | 5/1992 | Mochizuki | 175/170 |
| 5,928,519 | A | * | 7/1999 | Homan | 210/741 |
| 2003/0209363 | A1 | * | 11/2003 | Kadaster et al. | 175/5 |
| 2004/0079691 | A1 | * | 4/2004 | Jowett | 210/220 |

* cited by examiner

*Primary Examiner*—Duane S Smith
*Assistant Examiner*—Douglas J Theisen
(74) *Attorney, Agent, or Firm*—Richard W. Hanes; Hanes & Schutz, LLC

(57) ABSTRACT

A system for processing of multi-phase fluid, comprising a plurality of portable proximately arranged modules disposed over and spaced from a working pad where each module contains at least one separate processing element of a system for producing degassed and dehydrated crude oil and having a plurality of fluid carrying pipes interconnecting the processing elements in the said modules, including quick connect/disconnect joints in the pipe disposed between the said modules.

20 Claims, 5 Drawing Sheets

MICRO PROCESSING SYSTEM FOR MULTI-PHASE FLOW

FIELD OF THE INVENTION

The present invention relates to a system for processing multi-phase hydrocarbon well output comprising oil, natural gas and associated waters.

BACKGROUND OF THE INVENTION

The primary object of the present invention is to provide a method and apparatus for early production from a remote well site following discovery of an economic accumulation of hydrocarbons.

A second object of the invention is to provide truckable modules that, when combined with appropriate interconnections, will provide gas/oil/water separation of produced fluids and produce dehydrated and stabilized crude suitable for sale and shipping to a facility such as the Trans Alaska Pipeline System (TAPS).

Another object of the invention is to provide a means for eliminating expensive and time consuming construction in setting up a production facility by confining the required field work to site preparation, module assembly and module interconnects that utilize bolt-up joints.

A still further object of the present invention is to provide a modular processing system that can be constructed at an urban fabrication and manufacturing facility and then transported for final assembly and use at, for example, an insulated ice pad on a remote site in the north slope oil fields of Alaska.

Other objects, features and advantages of the present invention will become apparent upon a reading of the following description of a preferred form of the invention taken together with the accompanying drawings.

SUMMARY OF THE INVENTION

The present invention is a micro-processing system for treating multi-phase flows from oil wells whose output has not been developed to the point of becoming a part of a large scale production and processing facility. Particularly in the north slope region of Alaska, or similar arctic regions, exploration drilling and testing programs are conducted in the winter months. These cold weather operations utilize ice structures for roads and bridges that provide access to a drill site area and that serve as platforms for drilling rigs and associated equipment. Following the discovery of an economical accumulation of hydrocarbons, the apparatus and methods of the present invention can be advantageously employed as an early production system to bring the new field on line as soon as possible. The invention provides for truckable modules that contain the apparatus for separation of oil, water and gas and which contain and accommodate breezeway construction to house inter-module piping and electrical connections. The modular aspect of the system provides for incremental scale processing volumes with the addition of components as dictated by field characteristics.

During the initial period of production by the micro-processing system of the present invention the equipment and modules would likely be installed on an insulated ice pad adjacent the drilling ice pad. A manifold system interconnects the producing wells in the field and the produced fluids are piped to the micro-processing system where they are treated as described below. Temporarily, separated gas is flared until a gas compression unit can be brought on line. Produced water is disposed of through any kind of a permitted facility until equipment is made available to re-inject the water for appropriate reservoir management. These flexibilities are all products of the present invention, allowing early production from a new field without the necessity of a completely finished system but at the same time allowing for the modular expansion of the system as time goes on. This expansion would normally include the placement of gravel fill around the well heads and manifold system and the replacement of the ice pad beneath the micro-processing system with a gravel pad.

Until a common carrier pipeline can be constructed to interconnect the micro-processing system to a primary carrier, such as the Trans Alaska Pipeline System, a flexible pipeline can be installed to transport the produced crude oil to an existing gathering system.

The portable modular system of the present invention lends itself to multi-phase development, that is, early production and reduced capital costs in a first year of operation until the second or third year when the well is proven. In its second phase, as described below as the preferred form of the invention, the preferred form of the system would be capable of processing approximately 12,000 barrels of oil per day.

A letter within a circle on one figure of the drawings indicates a connection with a pipe having the same letter within a circle on another figure of the drawings.

DETAILED DESCRIPTION OF PREFERRED EMBODIMENT

Figure 1:
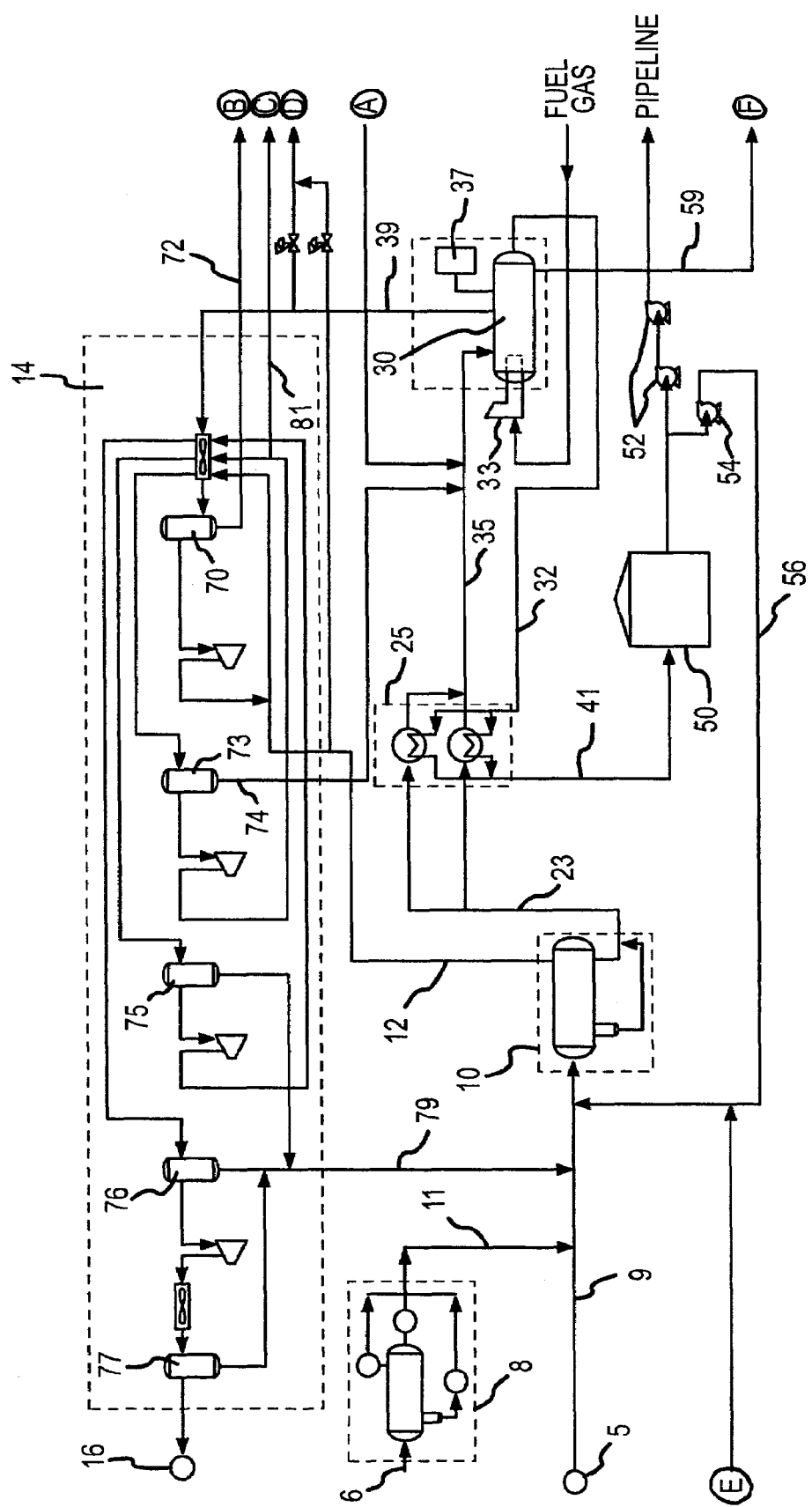
FIG. 1 is a partial diagrammatic flow diagram of the system of the present invention.
Figure 5:
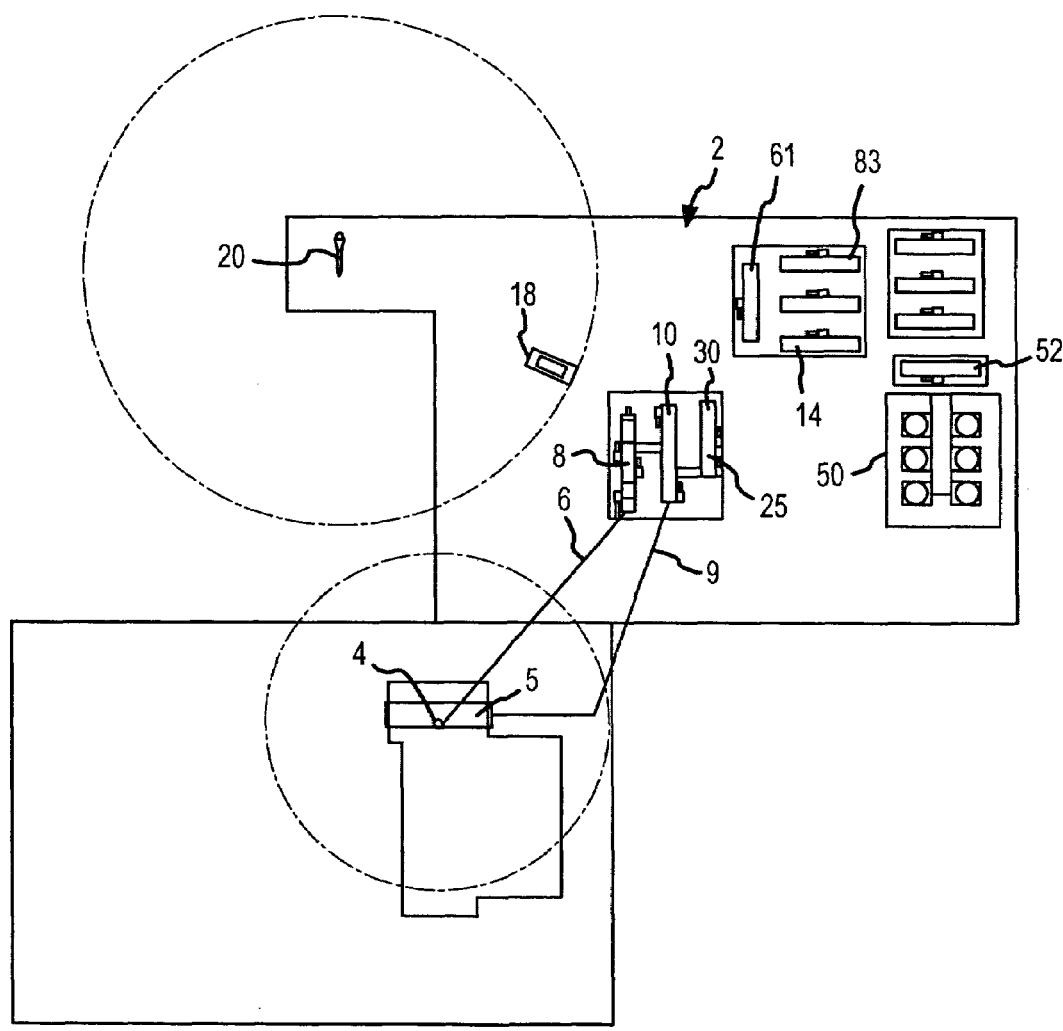
FIG. 5 is a diagrammatic plan view of a well site at which the micro-processing system of the present invention is installed.
Figure 6:
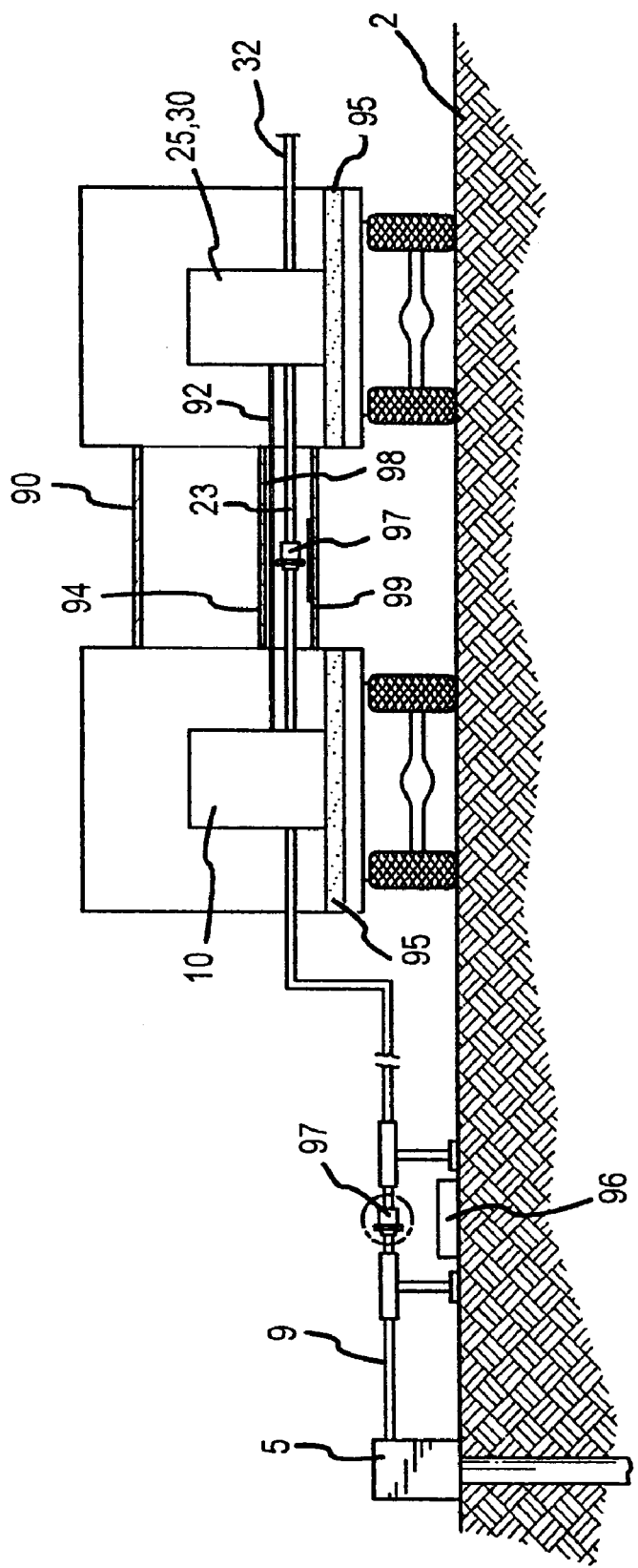
FIG. 6 is a partial side view of the transportable modules that comprise the micro-processing system of the present invention.

The primary processing elements of the mixed phase system of the present invention are diagrammatically illustrated in FIGS. 1, 5 and 6. An ice or gravel pad 2 provides the foundation for locating the essential elements of the system. A well head 4 of well known construction is associated with a subterranean crude oil well, producing mixed phase material comprising oil, natural gas and associated waters. One or more wells may be serviced by a group header 5.

A piping system 6 of small diameter pipe (3 inches for example) delivers the mixed phase material from an individual well to a three-phase test separator 8. In the exemplary system of this disclosure the capacity of the test separator is approximately 2000 barrels per day. As shown in FIG. 1, the material from the test well is separated for testing purposes and then recombined for processing with the main flow from the well head. The test separator is not essential to the operation of the other parts of the processing system but is desirable for testing the flow rate of an individual well.

In contemplation of a plurality of wells whose outputs are to be processed by the micro-processing system of the present invention, a group header 5 is provided to manifold the output of the group of wells. From the group header a first piping system 9 of larger diameter pipe (for example, ten inches)

delivers the mixed phase material to a two-phase inlet separator 10 for liquid and gas disengagement. The mixed phase material from the output of the test separator 8, if any, is conveyed through a test output piping system 11 to combine with the material being carried in the first piping system 9 from the group header. As a temporary measure in the early stages of operating the micro-processing system before the wells are proven, the gas from the inlet separator is directed to a flare knockout drum 18 prior to flaring the gas in a vertical flare stack 20. After the wells are proven and in a later stage of operating the system with additional processing elements, the gas output of the inlet separator 10 is conveyed by pipe 12 to a gas compression unit 14 where it is compressed for subsequent injection into gas re-injection wells 16.

Figure 2:
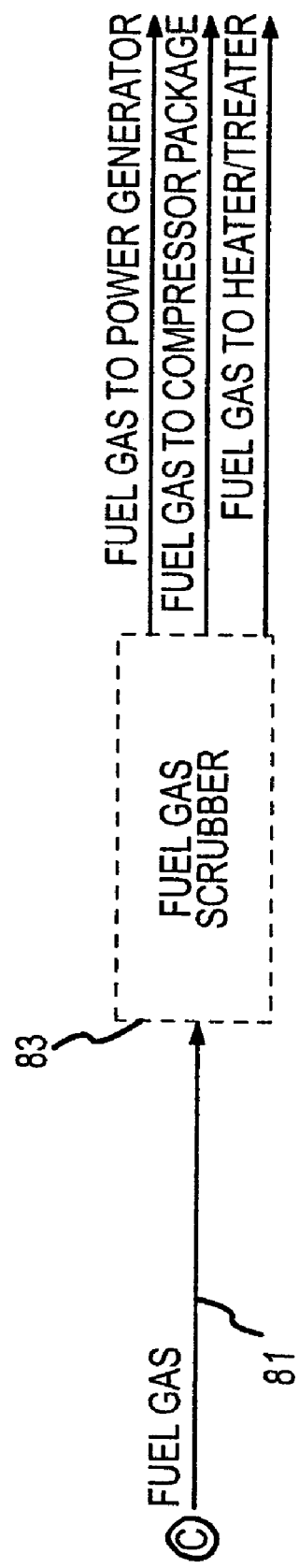
FIG. 2 is a diagrammatic flow diagram of the fuel gas portion of the system of the present invention.
Figure 3:
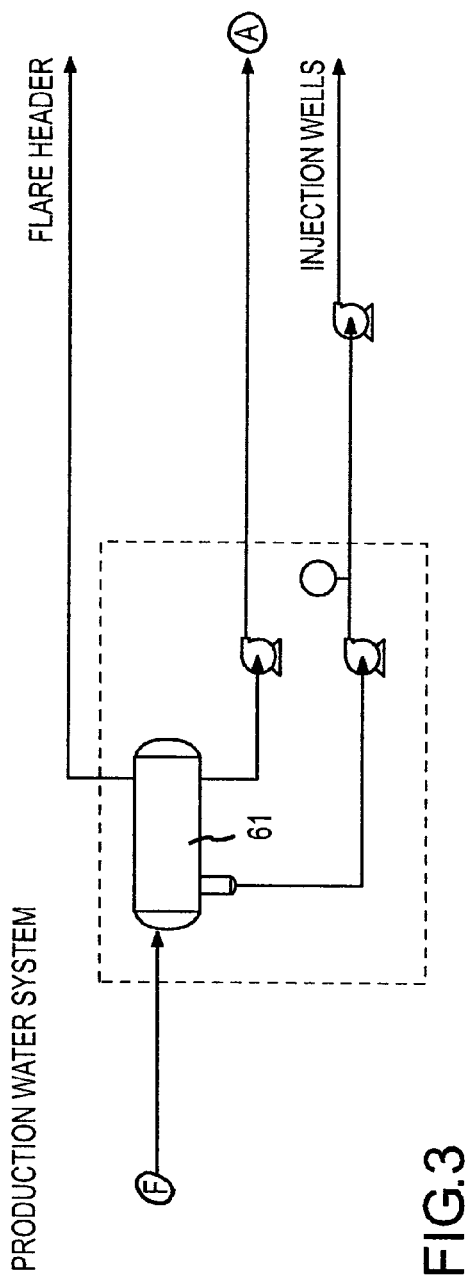
FIGS. 3 and 4 are continuations of the flow diagram of FIG. 1.
Figure 4:
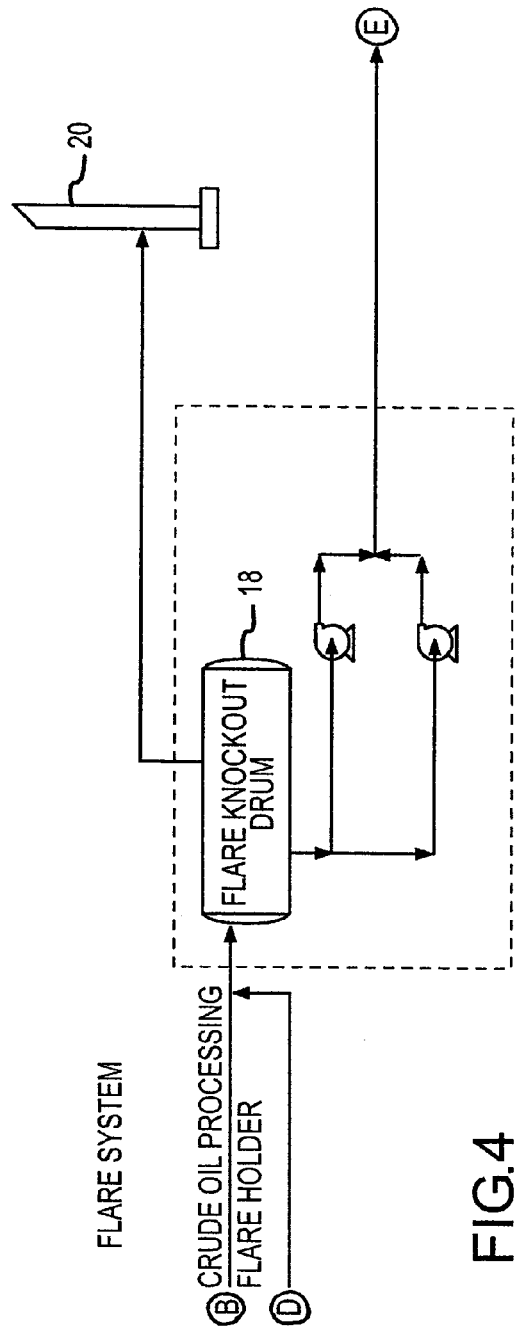

The gas compression unit 14 preferably includes a plurality of modular compressor packages to compress the gas separated from the crude oil for ultimate re-injection into the underground reservoir. The illustrated exemplary embodiment of the invention includes five stages. Liquids from the first stage suction scrubber 70 will be delivered to the flare knock our drum 18 via a pipe 72. Liquids from the second stage suction scrubber 73 are delivered to the inlet of the heater/treater 30 in pipe 74. The liquids from the third and fourth stage suction scrubbers 75 and 76, along with liquids from the fifth stage discharge scrubber 77, are transported in a pipe 79 to the inlet separator 10. Gas from the second stage scrubber is diverted into a pipe 81 that transports the gas to a fuel gas scrubber 83. The gas is then used as fuel for several different functions of the processing system, as shown in FIG. 2.

In the preferred form of the invention that contemplates mobile modular construction, the individual compressor packages are limited to about 1000 horsepower each, which is a size that will fit into a module of about 13×13×50 feet. The advantage of multiple smaller compressor packages is that variations in gas rate can be accommodated by adding or subtracting compression modules as required.

The crude oil and water output from the inlet separator 10 flows in a second piping system 23 to the heat exchanger 25. This exchanger heats the crude oil/water combination coming from the inlet separator 10 by heat exchange with hot crude oil delivered in pipeline 32 from the three-phase crude oil heater/treater 30. This set of exchanges allows the heater/treater 30 to operate at a sufficiently high temperature to meet the specifications for the shipped oil and cools the product oil before it flows to the atmospheric storage tanks 50, thereby reducing vapor emissions. The heater/treater 30 comprises two sections. The first uses a fire tube 33 fueled by fuel gas to provide two functions. The fire tube further heats the fluid flowing from the heat exchanger 25 in a third piping system 35. The heat supplied by the fire tube 33 also achieves knock out of the free water. The second section provides electrostatic dehydration of the crude oil emulsion. A 25 KVA transformer 37 is included in the exemplary system for this dehydration purpose. The produced gas passes to the compression unit 14 through conduit 39 or, alternatively, to the flare knock out drum 18. The treated oil passes through pipe 32 to the hot side of the crude oil heat exchangers 25 where the treated oil is cooled and flows in pipe 41 to the crude tanks 50. The tanks store the dehydrated oil for a short period of time prior to shipping in order to provide a small surge volume to de-couple production from pipeline shipping. One or more pumps 52 transfer the oil from the storage tanks 50 to the oil export pipeline at high pressure. A slop oil pump 54 pumps off-specification oil back to the beginning of the processing system in pipe 56.

Water produced in the heater/treater is routed through pipe 59 to the water degasser 61 after which the water is directed to injection wells. The separated gas is flowed to either the flare header 20 or the gas compression unit 14.

The previously referred to modular construction of the micro-processing system is shown in abbreviated form in FIG. 6. The truckable units illustrated are exemplary of the modular units illustrated in the diagrammatic plan view of FIG. 5. For illustrative purposes the truckable modular units shown shall be identified as the inlet separator 10 and the heat exchanger 25 in modular combination with the heater/treater 30. The first piping 9 is shown with a quick connect hammer union 97 between sections of the pipe with a drip tray 96 positioned below the union on the pad 2. In order to avoid melting or softening of the ice working pad beneath the trailers on account of the heat generated by the modules, insulation 95 is disposed in the bottom of each module.

The modular units comprising the truck trailers are interconnected by breezeways (hallways) 90 through which all piping and flexible hoses 23 and electrical conductors 92 are routed. A personnel walkway 94 is provided in the breezeway above the pipe and electrical connections. In the breezeway the pipes are interconnected by hammer unions 97 and the electrical connections 98 are made by plugs that allow for quick connection and disconnection to further the rapid assembly or modification of the processing system. A leakage containment floor 99 is disposed underneath the walkway 94 to detain any leakage from the pipe joint 97. These structural aspects of the modules that are mounted in adjoining trailers allow for a process of assembling and disassembling the processing unit that includes the ability to add additional modules the first plurality of modules by interconnecting the fluid carrying conduits and electrical conductors of additional processing element as the need for additional processing capacity is reached.

What is claimed is:

1. A system for processing mixed phase material containing oil, natural gas and associated waters, comprising;

a portable degassing separator having an input and first and second outputs;

first piping means for transporting three phase materials from at least one subterranean well to the input of the degassing separator;

first portable heating means having an input and an output;

second piping means interconnecting the first output of the degassing separator with the input of the first portable heating means;

second portable heating means, including dehydrating means, and having an input and first and second outputs;

third piping means interconnecting the output of the first portable heating means and the input of the second portable heating and dehydrating means;

portable crude oil cooling means having an input and an output;

fourth piping means interconnecting the first output of the second portable heating and dehydrating means with the input of the crude oil cooling means;

at least one temporary storage tank having an input;

fifth piping means interconnecting the output of the crude oil cooling means with the input of the at least one temporary storage tank.

2. The combination of claim 1 and further including;

a portable test separator having a combined multi-phase input and an output of three separate phases of oil, natural gas, and water;

test input piping means for transporting the combined multi-phase material from the at least one subterranean well to the input of the test separator;

test output piping means for transporting the output of the test separator to the first piping means.

3. The combination of claim 1 where the first portable heating means and the crude oil cooling means comprise a two stage heat exchanger.

4. The combination of claim 1 and further including;

multi stage gas compressor means having an input and an output;

sixth piping means interconnecting the second output of the degassing separator with the input of the gas compressor means; and injector means connected to the output of the gas compressor means for injecting compressed gas into a subterranean strata.

5. The combination of claim 1 and further including;

gas flaring means interconnected to the second output of the degassing separator.

6. The combination of claim 1 and further including;

water injection means connected to the second output of the second portable heating and dehydrating means for injecting water into a subterranean strata.

7. The combination of claim 3 and further including;

a plurality of enclosed breezeways interconnecting at least the degassing separator and the heat exchanger, said breezeways carrying at least the second piping means.

8. The combination of claim 7 and further including;

oil leakage containment means disposed below the piping means; and personnel walkways disposed in said breezeways and positioned above the piping means.

9. A modular system for processing of multi-phase fluid, comprising;

a plurality of portable proximately arranged modules disposed over and spaced from a working pad where each module contains at least one separate processing element of a system for producing degassed and dehydrated crude oil;

supporting means elevating each module from the working pad;

a plurality of fluid carrying pipes interconnecting the processing elements in the said modules, including quick connect/disconnect joints in the pipe disposed between the said modules.

10. The system of claim 9 where the quick connect/disconnect pipe joints are hammer union pipe connections.

11. The system of claim 9 and further including a plurality of electrical conductors interconnecting the modular processing elements and including electrical connectors in series with each conductor, said connectors disposed between said modules.

12. The system of claim 9 and further including oil spill containment means between modules.

13. The system of claim 9 and further including flexible hose means interconnecting the processing elements in at least two of the said modules having connection joints in the hose means disposed between modules.

14. The system of claim 9 where the supporting pad is ice or gravel and further including;

insulation means disposed in the bottom of each module to reduce heat transfer from the module to the underlying ice or gravel pad.

15. The system of claim 9 where the supporting means is a vehicular wheeled trailer.

16. A method for processing of three phase fluid in an arctic environment, comprising the steps of;

establishing a working ice or gravel pad proximate to at least one producing well having a well head;

positioning a first plurality of portable proximately arranged modules over the ice or gravel pad where each module contains at least one separate processing element of a system for producing degassed and dehydrated crude oil, including a first and a last producing element;

manifolding the output from the at least one producing well;

interconnecting the output manifold with the first processing element;

interconnecting the processing elements with fluid carrying conduits and electrical conductors by interconnecting disconnectable joints in the conduits and conductors, which joints are disposed at points between the modules;

interconnecting the last processing element with a temporary storage facility.

17. The method of claim 16 and further including the step of enclosing the disconnectable joints in the conduits of fluid carrying conduit and electrical conductors within an enclosed hallway disposed between modules.

18. The method of claim 16 and further including the step of providing oil spill containment beneath each disconnectable joint of fluid carrying conduit.

19. The method of claim 16 and further including the step of providing a heat transfer barrier between the modules and the ice or gravel pad.

20. The method of claim 16 and further including the step of adding additional modules to the first plurality of modules by interconnecting the fluid carrying conduits and electrical conductors of additional processing elements to the fluid carrying conduits and electrical conductors of the existing processing elements as the need for additional processing capacity is reached.

* * * * *